United States Patent
Kubo et al.

(10) Patent No.: US 9,301,098 B2
(45) Date of Patent: Mar. 29, 2016

(54) LOCATION DETECTION IN WIRELESS COMMUNICATION NETWORKS

(71) Applicant: Aruba Networks, Inc., Sunnyvale, CA (US)

(72) Inventors: Kiyo Kubo, Oakland, CA (US); Nick Farina, Portland, OR (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 13/941,380

(22) Filed: Jul. 12, 2013

(65) Prior Publication Data

US 2014/0031067 A1     Jan. 30, 2014

Related U.S. Application Data

(60) Provisional application No. 61/675,991, filed on Jul. 26, 2012.

(51) Int. Cl.
*H04W 4/02* (2009.01)

(52) U.S. Cl.
CPC ............. *H04W 4/025* (2013.01); *H04W 4/02* (2013.01)

(58) Field of Classification Search
USPC .................................................. 455/456.1
See application file for complete search history.

(56) References Cited

U.S. PATENT DOCUMENTS

| | | | | |
|---|---|---|---|---|
| 2006/0195551 | A1* | 8/2006 | Dowling | 709/217 |
| 2007/0260709 | A1* | 11/2007 | Dowling | 709/219 |
| 2012/0309409 | A1* | 12/2012 | Grosman et al. | 455/456.1 |
| 2013/0132854 | A1* | 5/2013 | Raleigh et al. | 715/738 |
| 2014/0019542 | A1* | 1/2014 | Rao et al. | 709/204 |
| 2015/0141005 | A1* | 5/2015 | Suryavanshi et al. | 455/434 |

* cited by examiner

*Primary Examiner* — Diane Mizrahi
(74) *Attorney, Agent, or Firm* — Mannava & Kang, P.C.

(57) ABSTRACT

Location detection of a mobile device is achieved by initiating an API call at an application program. The API call directs an operating system of the mobile device to initiate a scan of wireless access points within wireless communication range of the mobile device. The scanning performed by the mobile device is detected by the network via one or more of the wireless access points. A location of the mobile device is estimated by the network based on detection of the mobile device via the one or more wireless access points. Location-based services are provided to the mobile device by the network based on the estimated location of the mobile device. The location-based services may be transmitted to the mobile device via a different wireless access point and/or wireless communication protocol than used during scanning and/or detection of the mobile device.

18 Claims, 3 Drawing Sheets

LOCATION DETECTION IN WIRELESS COMMUNICATION NETWORKS

CROSS-REFERENCE TO RELATED APPLICATIONS

This application claims the benefit of priority on U.S. Patent Application No. 61/675,991 filed Jul. 26, 2012, the entire contents of which are incorporated by reference.

BACKGROUND AND SUMMARY

A wireless mobile computing device (i.e., mobile device) may estimate its location within a wireless communication network through triangulation and/or measurement of wireless signal strengths received from wireless access points located within wireless communication range of the mobile device. An access point typically supports a bi-directional communication link with the mobile device in which the mobile device can access information resources from the network. In this context, the access point serves as a gateway to a broader communication network. In other contexts, an access point may not support communications between a mobile device and a broader communication network for the purpose of accessing information resources from the network, but instead the access point may transmit wireless signals that may be received by the mobile device for the purpose of location estimation. Location estimation by the mobile device takes advantage of network operation in which wireless access points maintain an excited state and/or availability of their wireless receivers and/or transmitters, thereby enabling detection and measurement by the mobile device according to any suitable schedule.

On the network side, wireless access points may also detect the presence of mobile devices within wireless communication range by triangulation and/or measurement of wireless signal strengths received from the mobile devices. However, mobile devices often limit excitation of their wireless receivers and/or transmitters to reduce energy consumption and/or reduce congestion of the wireless network. Unfortunately, wireless access points are able to detect mobile devices that are within wireless communication range only when those mobile devices are also exciting their wireless receivers and/or transmitters. Accordingly, there are substantial periods during which the network cannot estimate the location of the mobile devices.

Improved location detection of a mobile device within wireless communication networks is achieved by initiating an application programming interface (API) call at an application program of the mobile device. The API call is received by and directs an operating system of the mobile device to initiate a scan of wireless access points and/or beacons within wireless communication range of the mobile device. Such a scan of the wireless access points and/or beacons may be performed according to a schedule defined by the application program and/or user of the mobile device.

The scanning performed by the mobile device is detected at a network device via one or more of the wireless access points. A location of the mobile device is estimated by the network, such as at the network device or a separate server system based on information obtained through detection of the mobile device via the one or more wireless access points. Network-side estimation of location may provide enhanced or improved location estimates during some scenarios, such as, for example, when the mobile device is located indoors or within a region where GPS location data and/or far-field cellular triangulation provide poor location estimates if calculated by the mobile device. Information resources in the form of location-based services are provided to the mobile device by the network device or server system based on the estimated location of the mobile device. In some examples, the location-based services may be transmitted to the mobile device via a different wireless access point and/or wireless communication protocol than was used during scanning and/or detection of the mobile device.

DETAILED DESCRIPTION

Figure 1:
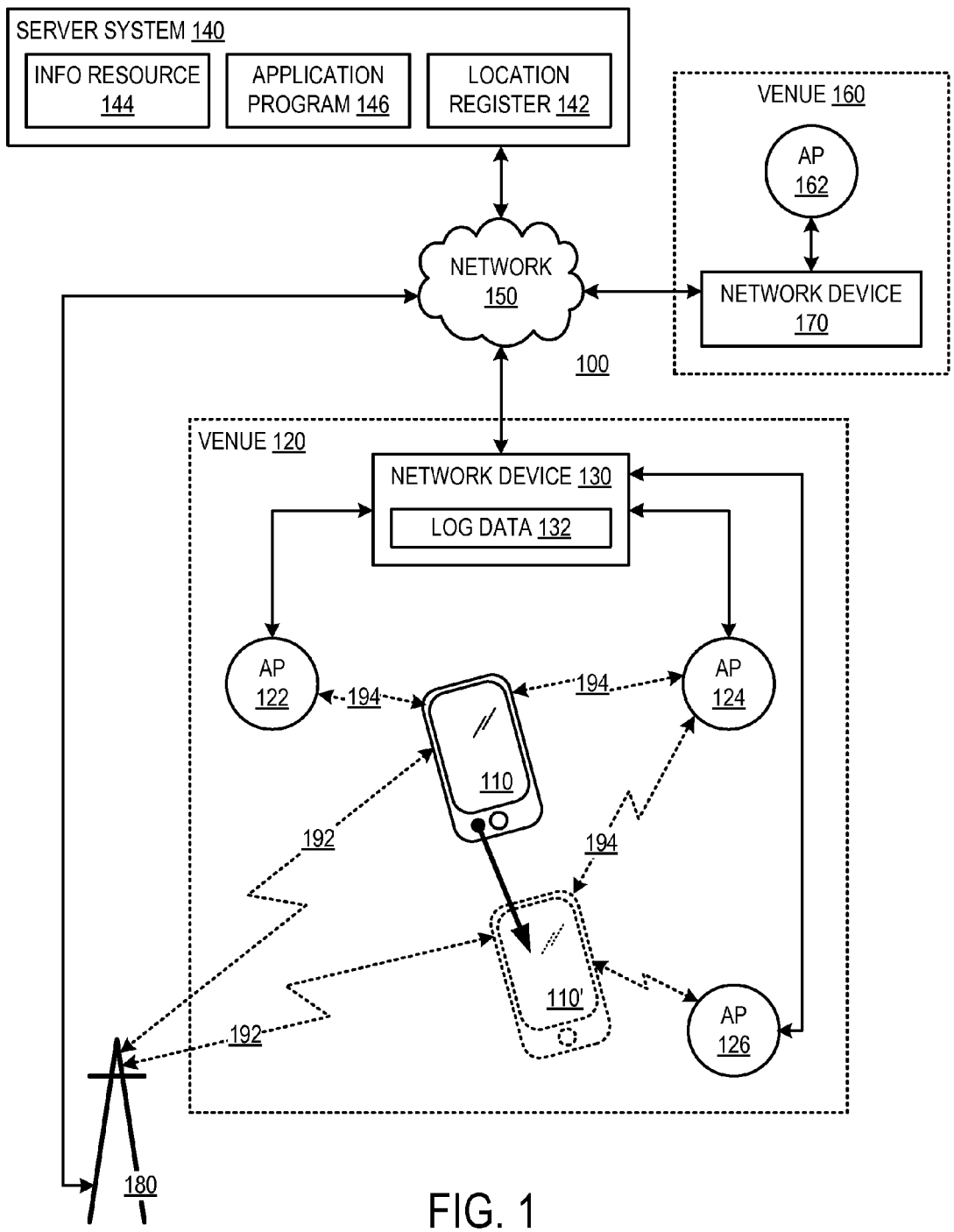
FIG. 1 is a schematic diagram depicting an example computing system including a wireless communication network.

FIG. 1 is a schematic diagram depicting an example computing system 100 that includes a number of computing devices communicating with each other over one or more wired and/or wireless communication networks. Within computing system 100, an example mobile device 110 is located within or proximate to a venue 120. As one example, venue 120 may include an indoor venue, such as a business, museum, school, or other suitable venue. However, venue 120 may also include an outdoor venue such as a park or public space.

As mobile device 110 moves within or relative to venue 120, the mobile device may enter and/or leave wireless communication range of one or more wireless access points, such as wireless access points 122, 124, 126, etc. Additionally, the wireless signal strength between the mobile device and each wireless access point may change as the mobile device moves relative to these wireless access points within venue 120. As mobile device 110 continues to move relative to the venue and these wireless access points, such as e.g., to location 110', the mobile device may, for example, leave wireless communication range of wireless access point 122 and enter wireless communication range of wireless access point 126.

As described in greater detail with reference to FIG. 2, mobile device 100 may, from time to time, initiate a scan of wireless access points within wireless communication range of mobile device 110. Wireless access points located within wireless communication range of mobile device 110 at the time of the scan may detect mobile device 110.

In at least some implementations, a network device 130 may aggregate, store, and update log data 132 responsive to mobile devices being detected via one or more wireless access points. As one example, each entry in log data 132 may include one or more of: (1) a wireless access point identifier that identifies a wireless access point, (2) a mobile device identifier that identifies a mobile device detected via that wireless access point, (3) a timestamp that indicates a time and/or time-dependent sequence that the mobile device was detected via the wireless access point, (4) a wireless signal strength at the time of detection that exists between the mobile device and wireless access point, (5) an estimated location of the mobile device calculated by network device 130, or other suitable information. A mobile device identifier may take the form of a MAC address, a hardware identifier, an operating system identifier, an application program identifier, a user account identity (e.g., a user name and/or password, or hashed value thereof), or other suitable identifier. The various identifiers described herein may include or take the form of a global unique identifier or other suitable identifier that enables two or more entities to be distinguished from each other within a particular domain.

In at least some implementations, log data 132 may be communicated to a server system 140 or other suitable network device over communications network 150 where the log data may be stored, aggregated, and updated from time to time at location register 142. Communications network 150 may include one or more of a wide area network (e.g., the Internet and/or core network infrastructure), a local area network (e.g., Intranet), or other suitable network type.

Location register 142 may include, may be based on, or may be otherwise derived from log data obtained from one, two, or more venues and/or network devices. For example, location register 142 may include, may be based on, or may be otherwise derived from log data 132 received from network device 130 for mobile devices located within or proximate to venue 120. Location register 142 may additionally include, may be based on, or may be otherwise derived from log data received from network device 170 for mobile devices located within or proximate to venue 160 that is associated with a wireless access point 162. In some implementations, functionality performed by server system 140, including maintenance of location register 142, may be performed in whole or in part by network device 130. In this implementation, location register 142 may reside at network device 130 or log data 132 may include one or more of the information elements of location register 142.

Location register 142 may be created from log data obtained from any suitable number of network devices for mobile devices detected via any suitable number of wireless access points. In at least some implementations, server system 140 may process log data to create location register 142. As one example, location register 142 may include or indicate an estimated location for each mobile device. As one example, each entry in location register 142 may include one or more of: (1) raw or pre-processed log data obtained from another source, (2) a mobile device identifier that identifies a mobile device detected, (3) an estimated location of the mobile device, (4) a timestamp that indicates a time and/or time-dependent sequence of that location estimate, or other suitable information.

It will be understood that an individual venue may include one, two, or more network devices that maintain log data and report log data to a server system. Network device 130 may reside on-premises at venue 120 where it may be operated and/or controlled by a venue operator or owner. Alternatively, network device 130 may be located at location that is remote from venue 120. A remotely located network device may be owned or operated by the venue operator/owner or may be owned or operated by a third-party entity.

Non-limiting examples of network device 130 include the CISCO brand of network device referred to as the MOBILITY SERVICES ENGINE or the EKAHAU brand of network devices referred to as the LOCATION SERVICES CONTROLLER. However, network device 130 may take other suitable forms. It will be understood that network device 130 and/or server system 140 may estimate location of a mobile device using any suitable technique, including triangulation, proximity to one or more wireless access points, and/or receiving geo-location assistance data from the mobile device or from third-parties concerning the mobile device location.

Server system 140 may include one or more server devices. These server devices may reside at common location or may be distributed across multiple locations. Accordingly, two or more servers of server system 140 may communicate with each other over communications network 150 in at least some implementations. Individual servers of server system 140 may be owned or operated by a common entity or a plurality of different entities. In some examples, a venue owner or operator may own or operate one or more servers of server system 140. However, one or more servers of server system 140 may be owned or operated by one or more third-party entities other than a venue owner or operator.

Server system 140 may further host information resources 144 that may be served to mobile devices. Information resources 144 may be requested, received, and used by an application program and/or operating system of a mobile device. For example, a particular information resource served to a mobile device may be selected by server system 140 based, at least in part, on the estimated location identified for that mobile device. As a non-limiting example, an information resource served to a mobile device may indicate an estimated location of that mobile device and/or information concerning physical objects, services, landmarks, etc. located in the vicinity of the estimated location of that mobile device. Such information may take the form of location-based services that is based, at least in part, on the estimated location of the mobile device.

In at least some implementations, information resources 144 may be communicated to a mobile device via one or more of the same wireless access points that detected the mobile device and upon which the information resources 144 may be based. However, in other implementations, information resources 144 may be communicated to a mobile device via a different wireless access point and/or via a different wireless communication protocol. For example, in FIG. 1, mobile device 110 may receive information resources 144 via a wireless access point 180. Wireless access point 180 in FIG. 1 may take the form of a cellular communications access point (e.g., base station, tower, eNode, etc.) offering a far-field wireless communication protocol such as CDMA, UMTS, LTE, Wi-Max, etc., while wireless access points 122, 124, 126, etc. may take the form of a wireless router or node offering a near-field communications protocol such as Wi-Fi, Bluetooth, RFID, etc. Wireless access point 180 may not be owned or operated by an owner or operator of venue 120 and/or access points 122, 124, 126. Wireless access point 180 may be configured to provide geographically broad wireless connectivity that covers the venue and other unrelated venues or geographic regions, and may instead form a public or general purpose wireless access point in contrast to wireless access points 122, 124, 126, etc. which may be specifically purposed for use within or in proximity to venue 120, or may be configured to provide wireless connectivity primarily to venue 120.

Server system 140 may further host an application program 146 that may be downloaded by mobile devices from server system 140. However, in some implementations, an application program may reside at the mobile device a priori, and may take the form of a general purpose browser application, for example. An application program, such as e.g., application program 146, upon being executed at a mobile device may initiate API calls to an operating system of the mobile device. One example API call may direct the operating system to initiate a scan at the mobile device of wireless access points within wireless communication range of the mobile device. Scans conducted by mobile devices in addition to communication links established between mobile devices and wireless access points may be detected via the wireless access points and may be contributed to the log data.

In at least some implementations, the location register 142, application program 146, and/or information resources 144 may reside at different server devices that are controlled or operated by different entities. Furthermore, functionality and/or information residing at server system 140 may instead reside at network device 130. Accordingly, it is understood that the configuration of computing system 100 depicted in FIG. 1 is merely one example of a computing system in which location estimation may be implemented, and that other configurations may be suitable.

Figure 2:
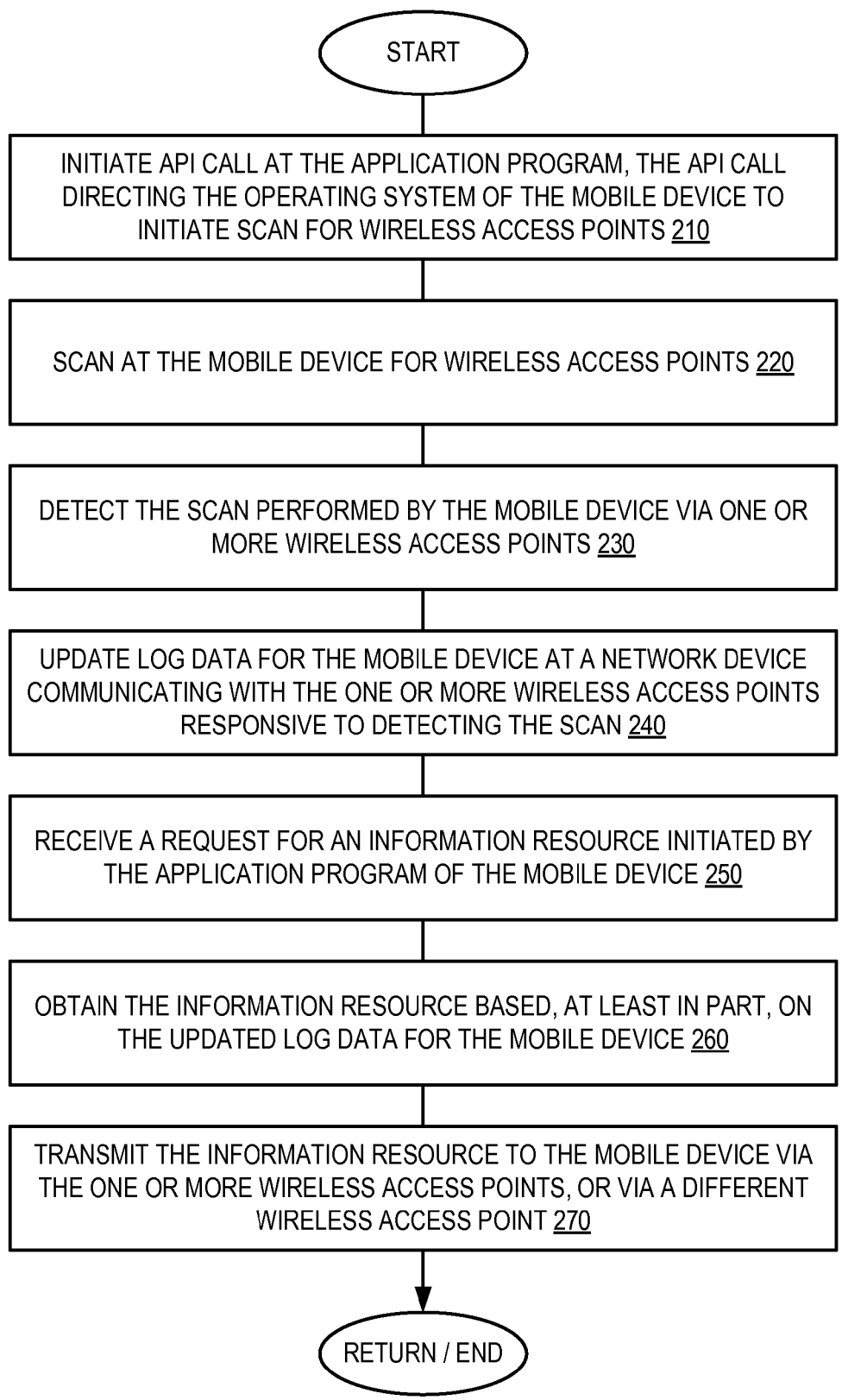
FIG. 2 is a flow diagram depicting an example method of location detection in a wireless communication network.

FIG. 2 is a flow diagram depicting an example method 200 of location detection in a wireless communication network. As one example, method 200 may be performed by or within the context of computing system 100 of FIG. 1.

At 210, the method includes initiating an API call at an application program of a mobile device. The API call may direct the operating system of the mobile device to initiate or otherwise conduct a scan for wireless access points. In the context of the Apple brand of mobile operating system iOS, for example, the API call make include or take the form of CLLocationManager. CLLocationManager manifests itself by having an object running on the operating system that causes the mobile device to scan for wireless access points. The API call take the form of a public API call that is published by the operating system developer for the purpose of enabling application developers to scan for wireless access points to estimate location at the mobile device. However, this API call also has the side-effect of making the mobile device visible to the network as a result of the scan. While the method at 210 is described in the context of an application programming initiating an API call. In other implementations, scanning may be initiated by the operating system. Furthermore, scanning may be initiated by the application program and/or operating system responsive to a user interaction with the mobile device, such as opening an application program, performing a selection, or moving within an environment as detected by an on-board inertial sensor.

At 220, the method includes scanning at the mobile device for wireless access points. The method at 220 may be performed by the operating system of the mobile device responsive to the API call initiated by the application program and received by the operating system. Scanning of the wireless access points may be performed by the mobile device according to a schedule defined by the application program and/or by the user. Scanning may be performed by exciting the wireless network using protocol-specific calls, requests, and/or responses. More frequent, continuous, or periodic scanning by the mobile device enables the wireless network to more accurately track the mobile device. This is in contrast to typical mobile device operation in which the wireless transmitter and/or receiver are operated in an un-excited or less-excited state to conserve energy and/or reduce network congestion. Estimated location provided by the network may be used to supplant, augment, or be combined with a location estimated by the mobile device.

At 230, the method includes detecting the scan performed by the mobile device via one or more wireless access points. As one example, the scan may be detected at a network device, such as previously described network device 130 of FIG. 1.

At 240, the method includes updating log data for the mobile device at the network device communicating with the one or more wireless access points responsive to detecting the scan. Alternatively, log data may be updated at a server system, such as previously described server system 140. Log data may take the form of log data 132 of FIG. 1.

At 250, the method includes receiving a request for an information resource initiated by the application program of the mobile device. Alternatively or additionally, the request for an information resource may be initiated by an operating system of the mobile device or a different application program of the mobile device from the application program that initiated the API call at 210. The request may be initiated responsive to a user action in some examples, such as opening an application program, performing a selection, or moving within an environment as detected by an on-board inertial sensor.

At 260, the method includes obtaining the information resource based, at least in part, on the updated log data for the mobile device. The method at 260 may be performed by the server system and/or the network device, depending on implementation. As one example, obtaining the information resource may include retrieving the information resource form a data store and/or calculating or generating the information resource. In some implementations, the request may include or indicate an identifier of the mobile device, enabling retrieval of the appropriate information resource for that mobile device based on its current estimated location. As previously discussed, the information resource may include or indicate the estimated location of the mobile device and/or may include or indicate location-based services.

At 270, the method includes transmitting the information resource to the mobile device via the one or more wireless access points, or via a different wireless access point. The different wireless access point may communicate with the mobile device via a different wireless communications protocol than the one or more wireless access points detected by the scan. For example, a different wireless access point may be used in scenarios where the mobile device is not accessing a wide area communications network via the one or more wireless access points that originally detected the mobile device.

The method at 270 may be performed by the server system and/or network device depending on implementation. The information resource, such as estimated location and/or location services may be presented to the user via an output device, such as a graphical display, for example. In some examples, such as a with an information "push" delivery implementation, a request may not be initiated at 250 in order to cause retrieval and delivery of information resources to the mobile device at 270.

Figure 3:
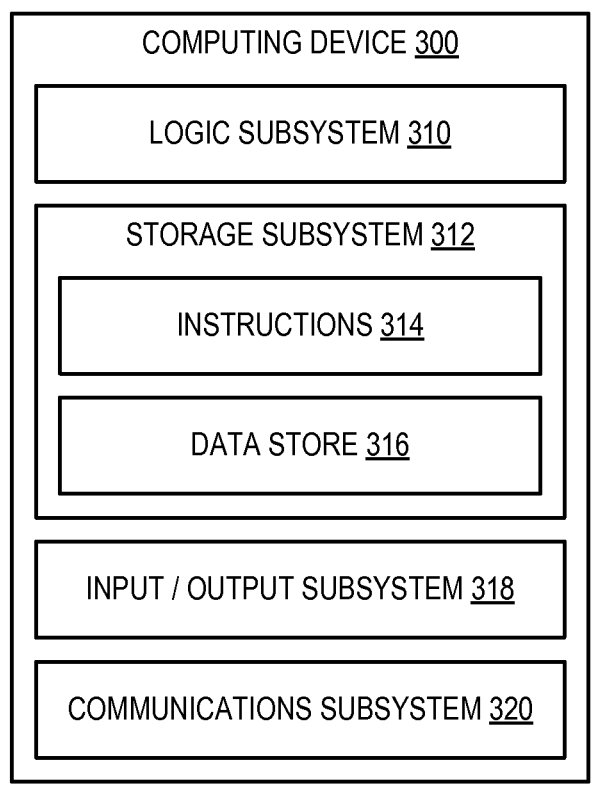
FIG. 3 is a schematic diagram depicting an example computing device.

FIG. 3 is a schematic diagram depicting an example computing device 300. Computing device 300 may take a variety of different forms. Non-limiting examples of computing device 300 include a personal computer, a server computer, a network device, a mobile communications device, or other suitable electronic device. For example, computing device 300 may include or take the form of one or more of the previously described computing devices of FIG. 1, such as network device 130, mobile device 110, server system 140, etc.

Computing device 300 may include a logic subsystem 310 and a storage subsystem 312. Logic subsystem 310 may include one or more processors and/or logic machines. Storage subsystem 312 includes a physical tangible storage medium for storing or otherwise holding information, such as instructions 314 and/or data store 316.

Instructions 314 may be executable by logic subsystem 310 to perform the operations, functions, processes, or methods described herein. Instructions 314 may include software and/or firmware. In the context of a personal computer or a mobile device, for example, instructions 314 may take the form of an operating system, and one or more application programs that communicate with the operating system via an application programming interface (API). The API may be defined by and supported by the operating system in a manner that enables an application program to transmit an API call to the operating system, responsive to which the operating system may perform an operation, communicate information to the application program, another program, or device via an API response or message.

Data store 316 may have or include any suitable information, such as previously described log data, location register, information resource, identifiers, etc.

Computing device 300 may include an input/output subsystem 318 that includes or otherwise interfaces with one or more input devices and/or output devices. Examples of input devices include a keyboard, keypad, computer mouse, physical button or switch, pointer device, controller device, microphone, or touch-screen display. Examples of output devices include a graphical display, an audio speaker, or a haptic feedback (e.g., vibration) device.

Computing device 300 may include a communications subsystem 320 that enables computing device 300 to communicate or otherwise interface with one or more other computing devices over a communications network. Communications subsystem may support one, two, or more communications protocols, including wired and/or wireless communications protocols. As one example, communications subsystem may support one, two, or more of the wireless communication protocols such as CDMA, UMTS, LTE, Wi-Fi, Wi-Max, Bluetooth, RFID, etc., among other suitable wireless communications protocols. Accordingly, it will be understood that communications subsystem 320 may include suitable transmitters, receivers, transceivers, amplifiers, filters, etc. to enable wired and/or wireless communications between computing device 300 and one or more other computing devices.

The various features, functionality, processes, methods, configurations, and/or techniques described herein are exemplary in nature. Disclosed implementations, embodiments, or examples are not to be considered in a limiting sense, because numerous variations are possible. The methods and/or processes described herein may represent one or more of any suitable number of processing strategies. The various methods and/or processes that have been described and/or depicted may be performed in the disclosed sequence, in other sequences, in parallel, or in some cases omitted. The subject matter of the present disclosure includes all novel and non-obvious combinations and sub-combinations of the various configurations and techniques, and other features, functions, acts, and/or properties disclosed herein, as well as any and all equivalents thereof.

What is claimed is:

1. A non-transitory computer readable medium comprising instructions that, when executed by one or more hardware processors of a mobile device, cause the one or more hardware processors of the mobile device to:
   initiate, at the mobile device, an Application Programming Interface (API) call to an operating system of the mobile device to initiate a scan for one or more wireless access points within wireless communication range of the mobile device, wherein the mobile device is to transmit at least one wireless signal during the scan, and wherein a network device is to detect transmission of the at least one wireless signal from the mobile device, to determine an information resource for the mobile device, and to communicate the information resource to the mobile device, wherein the information resource comprises an estimated location of the mobile device;
   receive, by the mobile device, the information resource from the network device; and
   display the received information resource at the mobile device.

2. The non-transitory computer readable medium of claim 1, wherein the information resource further comprises an indication of location-based services.

3. The non-transitory computer readable medium of claim 1, wherein the at least one wireless signal comprises a probe request.

4. The non-transitory computer readable medium of claim 1, wherein the at least one wireless signal comprises a data message.

5. The non-transitory computer readable medium of claim 1, wherein the instructions are further to cause the one or more hardware processors to:
   detect a user interaction with an application associated with location information executing on the mobile device; and
   initiate the API call in response to detection of the user interaction.

6. The non-transitory computer readable medium of claim 1, wherein the instructions are further to cause the one or more hardware processors to:
   detect input requesting viewing of an address, a map, a location, or location related information on the mobile device; and
   initiate the API call in response to detection of the input.

7. A mobile device comprising:
   a hardware processor; and
   a non-transitory computer readable medium communicatively coupled to the hardware processor, the non-transitory computer readable medium including instructions that, when executed by the hardware processor, cause the hardware processor:
   initiate an Application Programming Interface (API) call to an operating system of the mobile device to initiate a scan for one or more wireless access points within wireless communication range of the mobile device, wherein the mobile device is to transmit at least one wireless signal during the scan, and wherein a network device is to determine an information resource for the mobile device, and to communicate the information resource to the mobile device, wherein the information resource comprises an estimated location of the mobile device;
   receive the information resource from the network device;
   display the received information resource.

8. The mobile device of claim 7, wherein the information resource further comprises an indication of location-based services.

9. The mobile device of claim 7, wherein the at least one wireless signal comprises a probe request.

10. The mobile device of claim 7, wherein the at least one wireless signal comprises a data message.

11. The mobile device of claim 7, wherein the instructions are further to cause the hardware processor to:
    detect a user interaction with an application associated with location information executing on the mobile device; and
    initiate the API call in response to detection of the user interaction.

12. The mobile device of claim 7, wherein the instructions are further to cause the hardware processor to:
    detect input requesting viewing of an address, a map, a location, or location related information; and
    initiate the API call in response to detection of the input.

13. A computer implemented method, comprising:
    initiating, at a mobile device, an Application Programming Interface (API) call to an operating system of the mobile device to initiate a scan for one or more wireless access points within wireless communication range of the mobile device, wherein the mobile device is to transmit at least one wireless signal during the scan, and wherein a network device is to detect transmission of the at least one wireless signal from the mobile device, to determine an information resource for the mobile device, and to communicate the information resource to the mobile device, wherein the information resource comprises an estimated location of the mobile device;

receiving, at the mobile device, the information resource; and displaying the received information resource at the mobile device.

14. The method of claim 13, wherein the information resource further comprises an indication of location-based services.

15. The method of claim 13, wherein the at least one wireless signal comprises a probe request.

16. The method of claim 13, wherein the at least one wireless signal comprises a data message.

17. The method of claim 13, further comprising:
    detecting a user interaction with an application associated with location information executing on the mobile device; and
    initiating the API call in response to detection of the user interaction.

18. The method of claim 13, further comprising:
    detecting input requesting viewing of an address, a map, a location, or location related information; and
    initiating the API call in response to detection of the input.

\* \* \* \* \*